Figure 1:
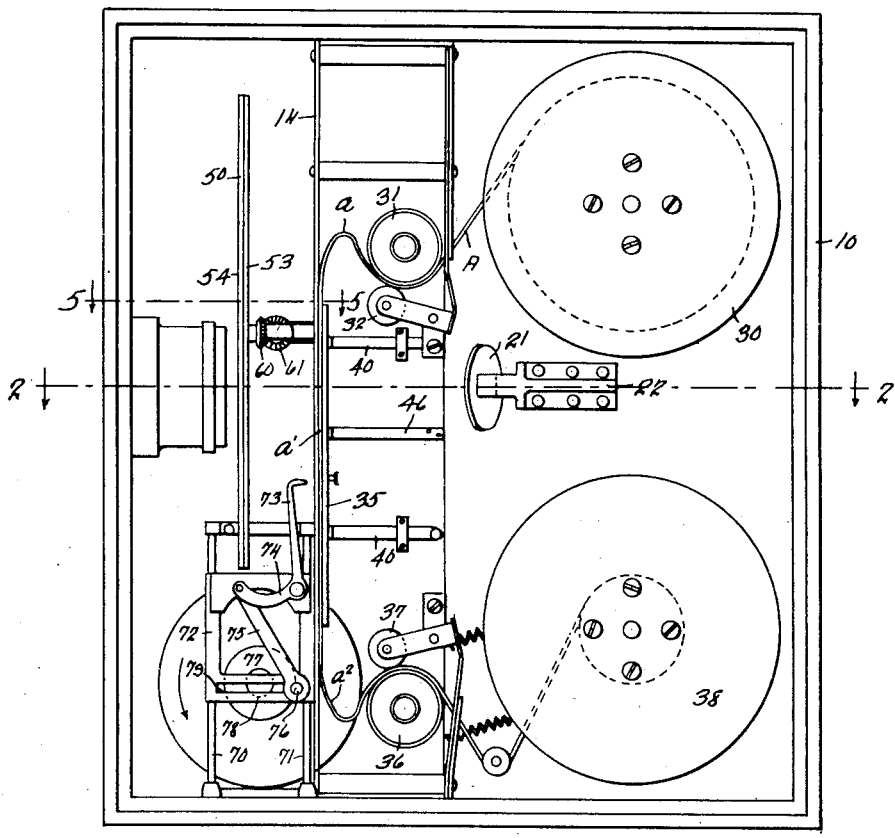

May 20, 1924.

H. C. OSBORN

MOTION PICTURE CAMERA

Filed Oct. 29 1920

1,494,701

5 Sheets-Sheet 1

Inventor

Henry C. Osborn,
By Baker & Macklin,
Attorneys.

May 20, 1924.

H. C. OSBORN

MOTION PICTURE CAMERA

Filed Oct. 29 1920

1,494,701

5 Sheets-Sheet 2

Inventor
Henry C. Osborn,
By Baker & Machlin,
Attorneys.

May 20, 1924.

H. C. OSBORN

MOTION PICTURE CAMERA

Filed Oct. 29 1920

5 Sheets—Sheet 3

1,494,701

Inventor
Henry C. Osborn,
By Baker & Macklin
Attorneys

May 20, 1924.

H. C. OSBORN

MOTION PICTURE CAMERA

Filed Oct. 29, 1920

1,494,701

5 Sheets-Sheet 4

Inventor
Henry C. Osborn,
By Baker & Macklin,
Attorneys

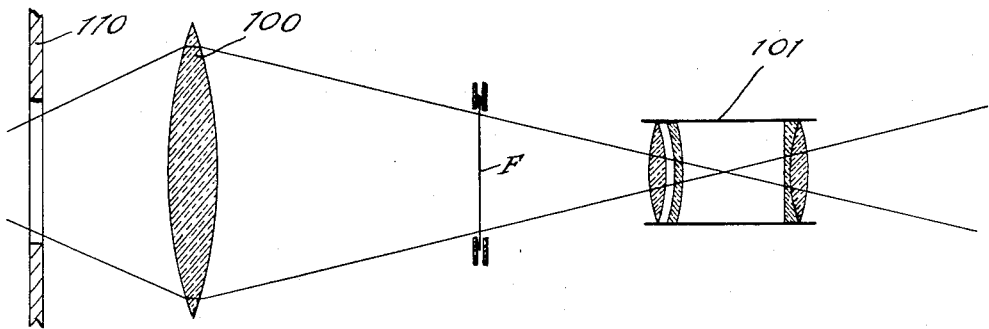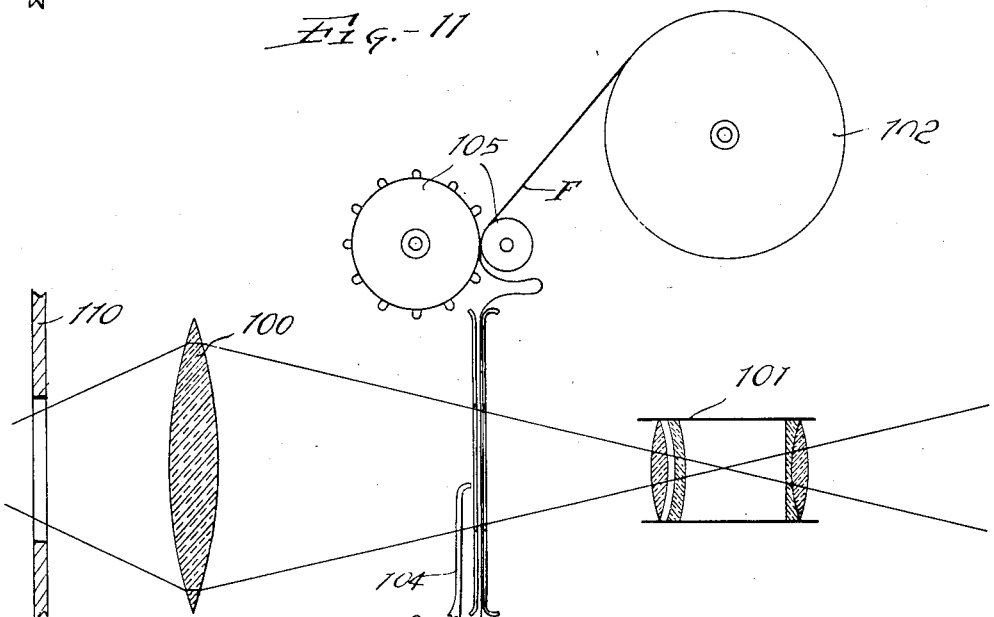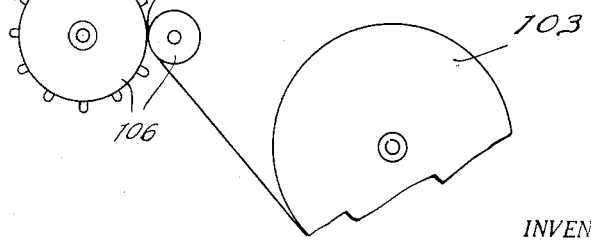

Patented May 20, 1924.

1,494,701

UNITED STATES PATENT OFFICE.

HENRY C. OSBORN, OF CLEVELAND, OHIO.

MOTION-PICTURE CAMERA.

Application filed October 29, 1920. Serial No. 420,381.

*To all whom it may concern:*

Be it known that I, HENRY C. OSBORN, a citizen of the United States, residing at Cleveland, in the county of Cuyahoga and State of Ohio, have invented a certain new and useful Improvement in Motion-Picture Cameras, of which the following is a full, clear, and exact description, reference being had to the accompanying drawings.

The object of this invention is to provide a motion picture camera arranged to produce a film which when projected, will give a stereoscopic effect. To this end I arrange the camera so that the pictures are taken alternately through two lenses arranged stereoscopically. One picture, therefore, is taken as viewed by the observer's right eye and the next by his left eye and so on. When a film so produced is projected onto a screen, the effect is to cause the image to stand out or have an appearance of depth corresponding to a stereoscopic picture. The present invention relates to the camera adapted to take the views stereoscopically on the film. An embodying of this camera is illustrated in the drawings hereof and is hereinafter more fully described and the essential characteristics are summarized in the claims.

Figure 2:
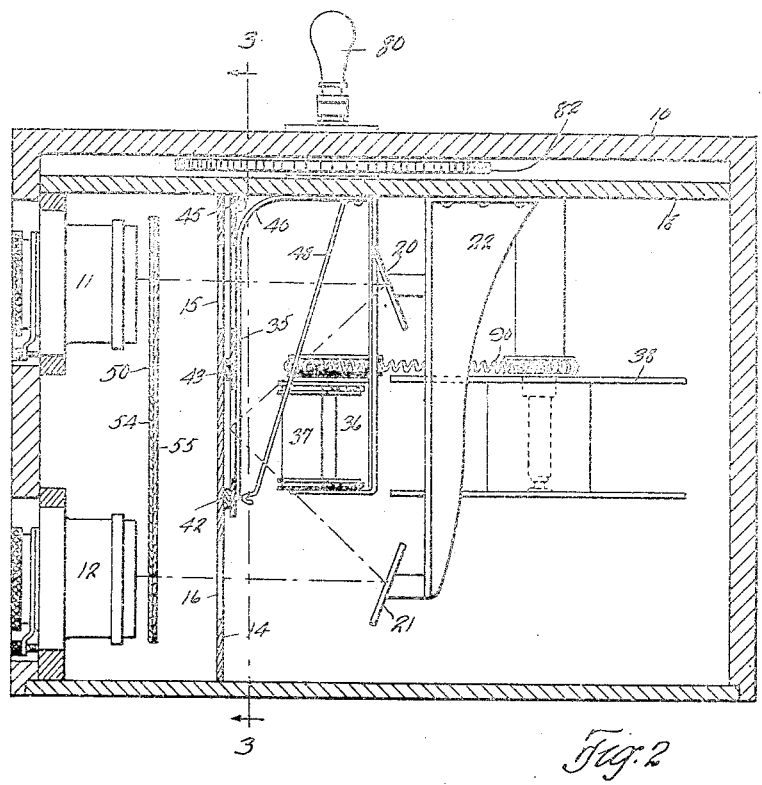
Figure 6:
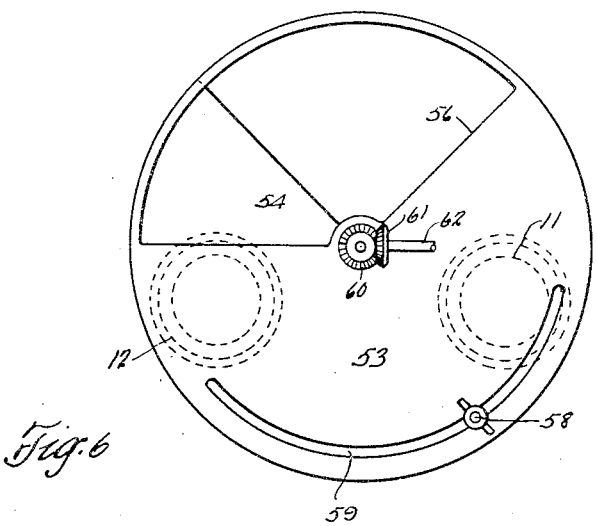
Figure 3:
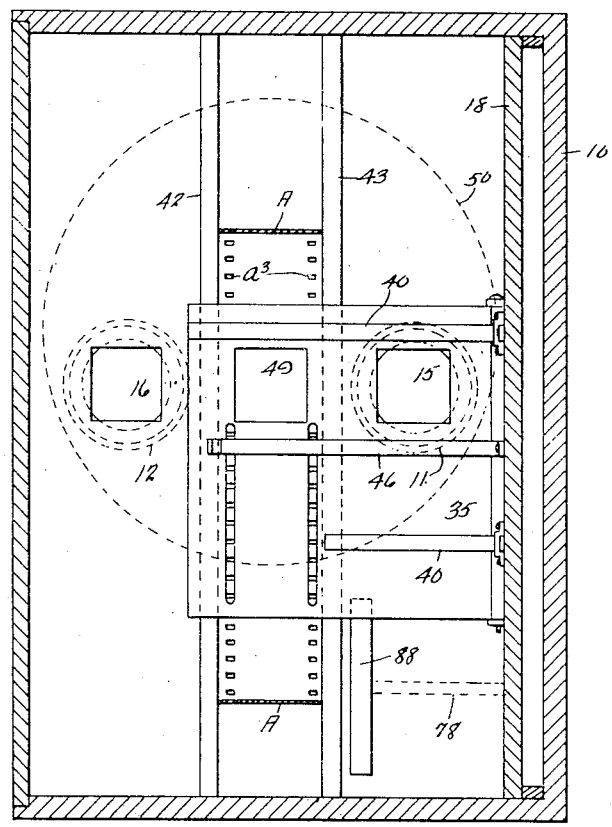
Figure 8:
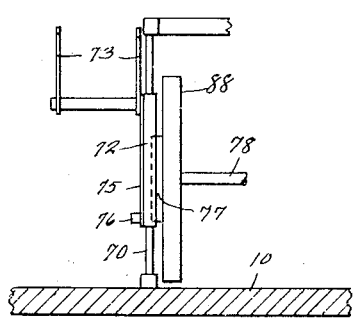
Figure 7:
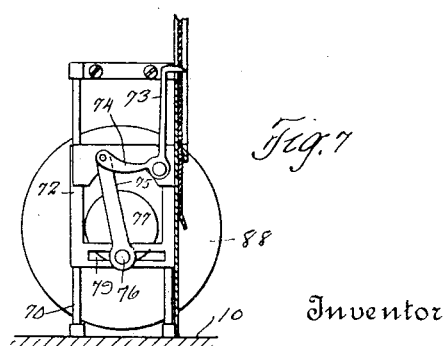
Figure 4:
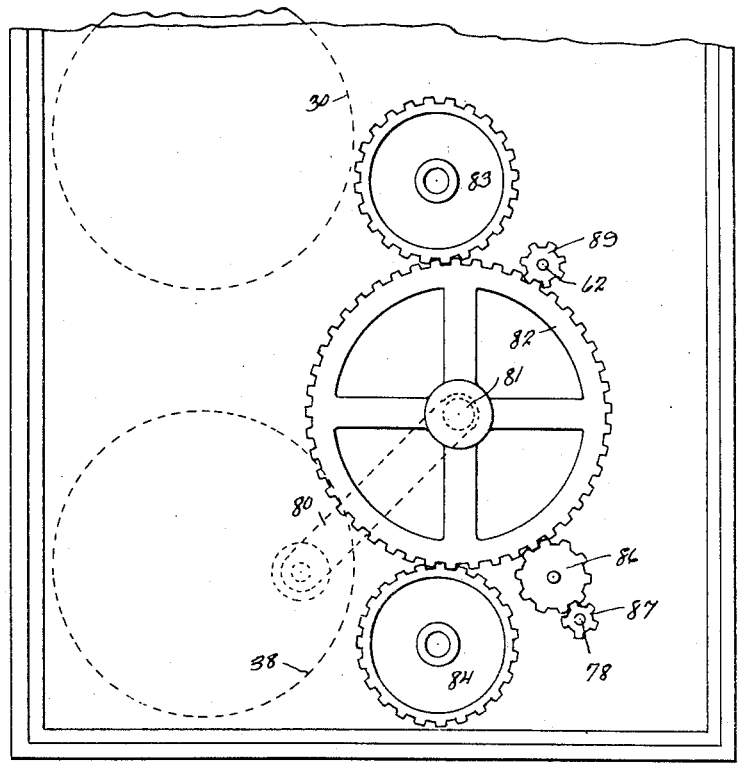
Figure 5:
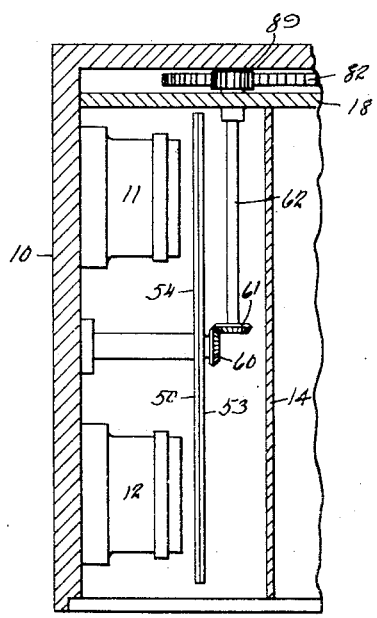
Figure 9:
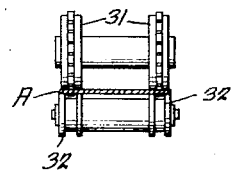

In the drawings, Fig. 1 is a side elevation of the camera with the side door removed. Fig. 2 is a horizontal section as indicated on the line 2—2 on Fig. 1. Fig. 3 is a vertical cross section behind the film, as indicated by the line 3—3 on Fig. 2. Fig. 4 is a side elevation of the driving gearing, being taken from the opposite side to Fig. 1. Fig. 5 is a horizontal section as indicated by the line 5—5 on Fig. 1. Fig. 6 is a detached view of the shutter showing its position with reference to the lenses. Fig. 7 is a side elevation of a mechanism which may be employed for intermittently progressing the film. Fig. 8 is an edge of the mechanism shown in Fig. 7, looking from the right hand edge. Fig. 9 is a detail, showing rollers for continuously advancing the film. Fig. 10 is a diametrical side view of a projecting device taken substantially on a central vertical plane passing therethrough. Fig. 11 is a similar view taken on a central horizontal plane.

In Figs. 1 to 5 inclusive, 10 indicates a suitable rectangular box, housing the mechanism of the camera. At the front of the box are two lenses 11 and 12, through which the object is viewed alternatively. Extending vertically across the box is a partition 14 having openings 15 and 16 directly behind the lenses 11 and 12. In line with these openings are inclined mirrors 20 and 21 positioned to direct the rays of light from the lenses diagonally inward to a central position where the film is located.

The film, indicated by A, passes from a supply roll 30 between feeding rolls 31 and 32 (which may be of the form shown in Fig. 9) thence to a loop $a$, to a vertical portion $a^1$, which lies behind the plate 14 and between it and a pressure plate 35. Below this pressure plate the film depends in a loop $a^2$ and thence passes between corresponding feed rolls 36 and 37 to a take-up roll 38. The film passes along the rear or right-hand side of the plate 14, between that plate and the plate 35 which is pressed toward it by a spring 40, and is guided at its edges by the vertical strips 42 and 43 in Fig. 2. The pressure plate 35 is shown as hinged at 45 and may be swung toward the right and held by a spring retaining the arm 46 when the film is being placed in position.

The film has its sensitized surface toward the rear, this is the right in Figs. 1 and 2, so that the rays of light coming from the lenses 11 and 12 are reflected by the mirrors 20 and 21 angularly positioned onto the sensitized surface of the film. The film is intermittently fed past an exposure opening 49 in the pressure plate 35 and when it is thus exposed, one lense or the other is shut off by means of a shutter 50 arranged to cause the exposure to be first through one of the lenses and then through the other.

The shutter may be of the form shown in Fig. 6 and consists of two plates 53 and 54 in surface contact with each other and each provided with a sector shaped opening, as shown at 56 in the plate 53 in Fig. 6. By reason of the two plates the amount of opening may be varied, the plates being clamped to each other by means of a screw-clamp 58 carried by the plate 45 and extending through an arcual slot 59 in the plate 53. The shutter is rotated in unison with the progress of the film by means of a beveled gear 60 on the shutter meshing with a beveled gear 61 on a shaft 62 connected with the driving mechanism.

Any suitable means may be employed for progressing the film and operating the shutter. The mechanism shown is as follows:

At the front or left-hand side of the plate 14 are stationary guide rods 70 and 71 on which is a vertically sliding carriage 72 to which is pivoted a claw 73 having prongs adapted to extend through the slots in the plate 14 and engage the openings $a^3$ in the film. The claw 73 has an arm 74 which is connected by a link 75 with the pin 76 of a disc-crank 77 on a shaft 78. This pin 76 extends through a horizontal slot 79 in the carriage 72, so that the rotation of the crank not only reciprocates the carriage but swings the lower end of the link 75 backward and forward. The rotation of the crank is in the direction indicated by the arrow in Fig. 1 and results in raising the claw free from the film to the uppermost position of the claw; then moving the claw downward while in such engagement, and then freeing the claw from the film. The claw thus has a four-way movement and operates to intermittently progress the film downwardly.

To drive the intermittent feeding mechanism, as well as the continuous mechanism and the shutter, I may provide the system of gearing shown in Fig. 4. As shown in this figure and also in Fig. 2, 80 indicates a crank by which the machine is operated. This crank is on a shaft 81 which carries a master gear 82 meshing with two gears 83 and 84 connected with the continuous feed rolls 31 and 36 respectively. This master gear connects by an idler 86 with a pinion 87 which is on the shaft 78 of the intermittent feed mechanism. A suitable fly-wheel 88 on this shaft maintains regularity of movement. Meshing with the master gear, is also a pinion 89 which is on the shaft 62, carrying the bevel gear 61 connected with the shutter. The take-up reel 38 is connected with the continuous feed wheel 36 by a slip belt 90 (which may be in the form of a spiral spring), so that the reel 38 may wind up any film available for it.

It is convenient to place the driving gearing in a compartment in the camera box between one wall thereof and a partition 18, and this partition may conveniently carry the supports for the reels and for the continuous feed and the brackets 22 for the mirrors.

It will be understood from the description given that the rotation of the crank 80 continuously feeds the film from the reel 30 to the reel 38 and at the same time intermittently progresses an intermediate section thereof past the exposure opening 49, the loops $a$ and $a^2$ allowing for the difference between the continuous feed and the intermittent feed. At the same time, the shutter operates to uncover first one lens and then the other, so that the pictures are taken alternately on the film A, through the respective lenses. The pictures are accordingly stereoscopic views, but are arranged in continuous succession on a film of single width.

When a film has been exposed in the camera described, and after it has been developed, it is then exposed in the usual projecting machine. The observer sees pictures which have been taken alternately with the right and left lens, but on account of the persistence of vision the effect is the same as though he were seeing these views simultaneously. The result is that a picture on the screen produces the effect of depth and apparent space dimension, which is not present with the usual flat picture.

In Figs. 10 and 11, I have diagrammatically illustrated a conventional projecting device for throwing a picture from a film F onto a screen and comprising a lense 100 for throwing the light from a suitable source at the left of partition 110 upon the exposed picture on a film and the compound lens 101 for focusing the rays upon the screen. 102 and 103 represent the usual winding and unwinding reels, mechanism 105 and 106 the usual continuous feed, and the member 104 represents an intermittent feed device. It will be seen that after the pictures have been produced on the film in the manner described above that passing the film through such a single lens projecting device as shown, or any other ordinary form of projecting device will cause the pictures taken by the spaced lenses of the camera to be projected upon the screen alternately to give a stereoscopic effect.

I claim:

1. The combination of a pair of lenses side by side, means for holding a film in intermediate position and facing rearwardly, means providing a single framing opening on the rear side of the film, a pair of mirrors adapted to reflect the light from each lens through the framing opening, and shutter mechanism adapted to close the different lenses alternately.

2. In a camera, the combination of a casing, a pair of lenses carried thereby, a partition across the casing having light openings registering with the lenses, a film guided along the partition with its sensitized side away from the lenses, a pair of diagonally arranged mirrors adapted to reflect the light from the lenses onto the sensitized side of the film, and a shutter between the partition and lenses adapted to close the two lenses alternately.

3. The combination of a camera box, a pair of lenses side by side carried thereby, a partition across the box having exposure openings directly behind the lenses and having an intermediate vertical film guide, means for continuously feeding a film and means for intermittently progressing it along said guide, and a pair of diagonally positioned mirrors behind the partition and in line with the transmission openings and adapted to reflect the light onto the film.

4. The combination of a camera box, a pair of lenses side by side carried thereby, a partition across the box having exposure opening directly behind the lenses and having an intermediate vertical film guide with a frame opening, means for intermittently progressing a film along said guide with its sensitized surface toward the rear, a pair of diagonally positioned mirrors behind the partition and in line with the transmission openings and adapted to reflect the light onto the film through the same opening, and a rotary shutter at the rear of the lenses and in front of the partition and adapted to shut off the rays from the two lenses alternately.

In testimony whereof, I hereunto affix my signature.

HENRY C. OSBORN.